June 23, 1970 D. S. RITCHIE 3,516,748
OPTICAL SYSTEM FOR READING THE SCALES OF AZIMUTH
MEASURING INSTRUMENTS
Filed Dec. 8, 1965
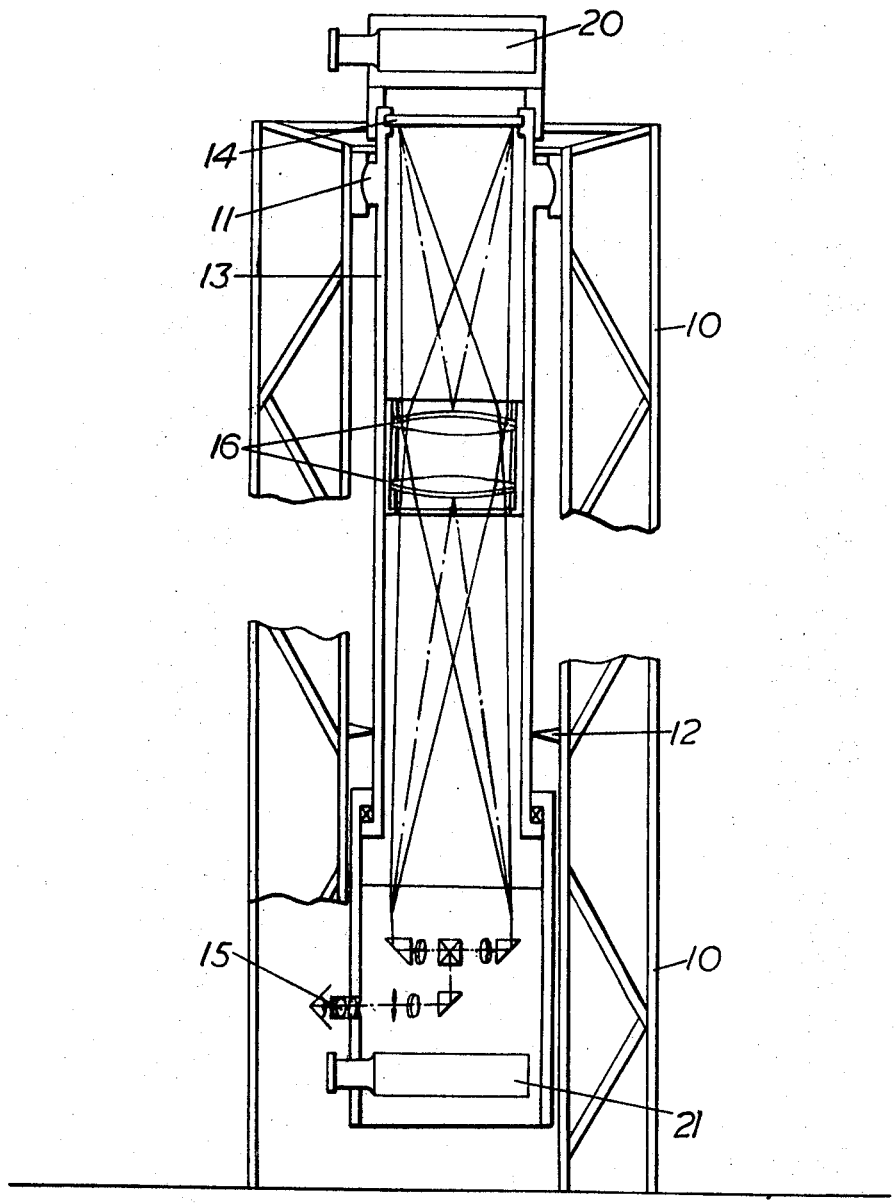
Inventor
DAVID SCARTH RITCHIE
By
Mason, Fenwick, & Lawrence
Attorneys 3,516,748
OPTICAL SYSTEM FOR READING THE SCALES
OF AZIMUTH MEASURING INSTRUMENTS
David S. Ritchie, Anniesland, Glasgow, Scotland, assignor to Barr & Stroud Limited, Anniesland, Glasgow, Scotland
Filed Dec. 8, 1965, Ser. No. 512,484
Claims priority, application Great Britain, Dec. 9, 1964, 50,091/64
Int. Cl. G01c *1/06, 9/02;* G01b *11/26*
U.S. Cl. 356—139                                           5 Claims

ABSTRACT OF THE DISCLOSURE

An optical system for precision reading of the angle between pointing devices vertically displaced from each other consisting of a scale associated with one pointing device, a common projection lens system for forming an image of the scale adjacent the second pointing device and a prism system associated with the second device for combining images of diametrically opposite parts of the scale image and presenting a combined image to an eyepiece.

---

This invention relates to an optical system for reading the scale of an angle measuring instrument and in particular to an angle transfer system of high precision for reading the angle between two alignment or pointing devices remotely situated from each other.

Precision theodolites are normally provided with a circular scale which is read at two points diametrically opposite, in order to give an accurate reading by eliminating errors due to de-centring of the scale relative to the line joining the points at which the scales are read. The optical system used for reading opposite sides of the scale comprises two separate projecting systems forming a common image in an eyepiece.

In certain applications, however, it is desirable to be able to measure the angle between a pointing device, to which an angular scale is attached, and another pointing device displaced many feet from the scale along the axis of rotation of the scale. The optical system used in precision theodolites, if extended to read over a distance, would be unsatisfactory on account of the unwanted relative movement of optical parts. It would not be a satisfactory proposition to endeavour to produce a long framework holding the optical parts which would provide freedom from relative movement to the degree of accuracy required.

The present invention permits transfer by optical projection of the scale over a distance without *rotation* of the image of the scale. It also provides for the angular readings to be made of the scale *image* by the conventional compact theodolite scale reading optical system. This latter scale reading system eliminates, as in a theodolite, any de-centring errors of the scale and likewise any further de-centring errors of the projected image of the scale.

The present invention relates to an optical system for precision reading of an angle between two pointing devices which are vertically displaced relative to each other, generally including a scale associated with one of the pointing devices, a common precision lens for forming an image of the scale at a point adjacent the second pointing device, and a prism system associated with the second pointing device for combining the images of diametrically opposite points of the scale image and presenting a combined image to an eyepiece.

The projection lens system may be mounted in a tube extending between the scale member and the remote scale reading eyepiece system and the tube may be mounted in geometric bearings in an outer support. Such an arrangement does not improve the inherent accuracy of the system, but ensures that large translational movement of the image will not occur which would make readings difficult or impossible to obtain.

An embodiment of the present invention will now be described, by way of example, with reference to the accompanying drawing which diagrammatically illustrates an optical system for an azimuth measuring system used in mine shafts or structures in which the pointing devices are situated at different vertical levels. The invention may equally well be used for transferring angles in the horizontal or inclined directions.

Referring now to the drawing, a support 10 mounts in geometric bearings 11 and 12 an inner tube 13. At the top of the tube 13 is mounted a scale member 14. The length of the tube for a single projection stage is limited only by the available lens or tube diameters. The scale member is rotatable with a collimator 20 which is used to align the scale on a distant reference mark, thus defining a line of sight. As alternatives to the collimator, an autocollimator may be used to align the scale to a reference reflecting surface, or a reflector may be mounted with the scale and aligned to a reference autocollimator. An azimuth scale is provided around the periphery of the scale member 14, and can be viewed from below. At the bottom of the inner tube 13 is provided a conventional theodolite optical system 15, referred to hereinafter as the eyepiece system, which by means of lenses and prisms combines two scale images into a single image. The eyepiece system 15 is rotatable with a collimator 21 used in the same manner as at the upper end to define a line of sight. Again, an autocollimator or a reflector may be substituted for the collimator 21. A projection lens system 16, mounted in the tube 13, acts as a common lens system for transmitting the scale images on opposite sides of the scale to the eyepiece system.

By using the present invention, the angles between lines of sight defined in parallel planes situated some distance apart, may be measured accurately. Moreover, errors do not arise due to the displacement of the common projector lens system, due to the rotation-free projection which this provides. Also the system is protected against mechanical flexure by its mounting inside the outer tube.

It is of course apparent that if the pointing devices are too far apart to permit the convenient use of a single optical stage, two or more stages may be provided as desired.

What I claim is:

1. A device for measuring angles comprising first and second sighting means disposed in remotely spaced relation, said sighting means having sighting axes lying in spaced parallel planes, means mounting said first and second sightly means for rotation about a common axis disposed perpendicular to said spaced parallel planes, a scale mounted between said first and second sighting means and fixedly connected to the other of said sighting means for rotation with said one of said sighting means, an optical system including means for viewing an image of said scale incident thereon disposed between said sighting means and fixedly connected to the other of said sighting means for rotation with said other of said sighting means, a single means disposed between said scale and said optical system for projecting an image of said scale on said optical system, and said optical system including means for viewing diametrically opposed areas of said scale image, means for combining the viewed opposed areas to compensate for displacement of the scale image relative to said com- 2. A device for measuring angles according to claim 1, wherein said means for projecting said scale image consists of a single projection lens disposed between said scale and said optical system, in alignment therewith.

3. A device for measuring angles according to claim 1, wherein said scale lies in a plane disposed normal to the common axis of rotation of said sighting means, said scale is provided with angularly spaced graduations thereon located circumferentially about said common rotational axis, and the axes of said sighting means are disposed diametrically relative to said scale.

4. A device for measuring angles according to claim 1, wherein said optical system includes a set of prisms.

5. A device according to claim 1, wherein said scale lies in a plane disposed perpendicular to the rotational axis of the device, said scale is provided with angularly spaced graduations thereon located circumferentially about said rotational axis, the axes of said sighting devices are disposed diametrically relative to said scale, said projecting means consists of a single projection lens disposed between said scale and said optical system, in alignment therewith, and said optical system includes a set of prisms.

References Cited

UNITED STATES PATENTS

| | | |
|---|---|---|
| 940,425 | 11/1909 | Barr et al. |
| 1,074,260 | 9/1913 | Guerrant _____ 33—222 X |
| 2,356,274 | 8/1944 | Roger. |
| 2,404,770 | 7/1946 | Bennett et al. |
| 2,422,611 | 6/1947 | Becker et al. |
| 2,757,567 | 8/1956 | Hillman et al. |
| 2,917,967 | 12/1959 | Steglich _____ 350—33 X |
| 2,976,760 | 3/1961 | Callahan _____ 350—33 X |
| 3,038,368 | 6/1962 | Fialovszky. |
| 3,166,624 | 1/1965 | Vargady. |
| 3,200,696 | 8/1965 | Lang et al. |
| 902,272 | 10/1908 | Berger _____ 33—66 |
| 1,337,912 | 4/1920 | Hughes et al. _____ 356—146 |
| 1,366,498 | 1/1921 | Schauff _____ 33—66 |
| 1,520,383 | 12/1924 | Bauersfeld et al. _____ 356—138 |
| 3,348,448 | 10/1967 | Callahan _____ 356—144 X |

RONALD L. WIBERT, Primary Examiner

W. A. SKLAR, Assistant Examiner

U.S. Cl. X.R.

33—66, 72; 356—140, 146, 247, 253, 254